US010223883B2

(12) United States Patent
Richardson et al.

(10) Patent No.: US 10,223,883 B2
(45) Date of Patent: *Mar. 5, 2019

(54) SYSTEMS AND METHODS FOR SECURITY SENSING IN A POWER CABLE FOR AN ARTICLE OF MERCHANDISE

(71) Applicant: InVue Security Products Inc., Charlotte, NC (US)

(72) Inventors: Justin A. Richardson, Waxhaw, NC (US); Jonathon D. Phillips, Fort Mill, SC (US); Gary A. Taylor, Fort Mill, SC (US)

(73) Assignee: InVue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,979

(22) Filed: May 11, 2018

(65) Prior Publication Data

US 2018/0261058 A1 Sep. 13, 2018

Related U.S. Application Data

(60) Continuation of application No. 15/667,284, filed on Aug. 2, 2017, now Pat. No. 9,972,178, which is a
(Continued)

(51) Int. Cl.
*G08B 13/14* (2006.01)
*G06Q 30/00* (2012.01)

(52) U.S. Cl.
CPC ..... *G08B 13/1454* (2013.01); *G06Q 30/0185* (2013.01); *G08B 13/1463* (2013.01)

(58) Field of Classification Search
CPC .......................... G08B 13/1454; G06Q 30/0185
(Continued)

(56) References Cited

U.S. PATENT DOCUMENTS 4,760,382 A 7/1988 Faulkner
5,052,199 A 10/1991 Derman
(Continued)

FOREIGN PATENT DOCUMENTS

GB 2287339 A 9/1995
GB 2491095 A 11/2012
(Continued)

OTHER PUBLICATIONS

Extended European Search Report from corresponding European Application No. 15740530.9, dated Dec. 20, 2016 (11 pages).
(Continued)

*Primary Examiner* — Tai T Nguyen
(74) *Attorney, Agent, or Firm* — InVue Security Products Inc.

(57) ABSTRACT

Embodiments of the present invention are directed to merchandise security systems and methods for displaying and protecting an article of merchandise from theft. In one example, the system includes a sensor configured to be secured to the article of merchandise, wherein the sensor includes alarming circuitry. The system also includes a tether comprising a pair of conductors electrically connected to the alarming circuitry, wherein the pair of conductors is configured to transfer power to the sensor and/or to the article of merchandise. In response to power ceasing to be transferred, the alarming circuitry is configured to monitor an electrical signal transmitted through the pair of conductors in order to determine whether the tether has been cut or removed from the sensor.

28 Claims, 9 Drawing Sheets

Related U.S. Application Data division of application No. 15/111,626, filed as application No. PCT/US2015/012378 on Jan. 22, 2015, now Pat. No. 10,043,356.

(60) Provisional application No. 61/930,529, filed on Jan. 23, 2014.

(58) Field of Classification Search
USPC .......................... 340/568.1, 568.3, 540, 541
See application file for complete search history.

(56) References Cited

U.S. PATENT DOCUMENTS

| | | |
|---|---|---|
| 5,243,328 A | 9/1993 | Lee et al. |
| 5,341,124 A | 8/1994 | Leyden et al. |
| 5,457,745 A | 10/1995 | Wang |
| 5,499,023 A | 3/1996 | Goldschmidt |
| 5,543,782 A | 8/1996 | Rothbaum et al. |
| 6,237,375 B1 | 5/2001 | Wymer |
| 6,308,928 B1 | 10/2001 | Galant |
| 6,386,906 B1 | 5/2002 | Burke |
| 6,443,417 B2 | 9/2002 | Galant |
| 6,459,374 B1 | 10/2002 | Rand et al. |
| 6,700,488 B1 | 3/2004 | Leyden et al. |
| 6,763,690 B2 | 7/2004 | Galant |
| 6,842,114 B2 | 1/2005 | Billiard |
| 6,989,747 B2 | 1/2006 | Konecnik |
| 7,174,752 B2 | 2/2007 | Galant |
| 7,209,038 B1 | 4/2007 | DeConinck et al. |
| 7,242,280 B2 | 7/2007 | Frederiksen |
| 7,667,601 B2 | 2/2010 | Rabinowitz et al. |
| 7,710,266 B2 | 5/2010 | Belden, Jr. et al. |
| 7,737,845 B2 | 6/2010 | Fawcett et al. |
| 8,191,851 B2 | 6/2012 | Crown |
| 8,242,906 B2 | 8/2012 | Fawcett |
| 8,360,373 B2 | 1/2013 | Johnson et al. |
| 8,464,563 B2 | 6/2013 | Perez et al. |
| 8,523,122 B2 | 9/2013 | Johnson et al. |
| 8,698,617 B2 | 4/2014 | Henson et al. |
| 8,698,618 B2 | 4/2014 | Henson et al. |
| 8,711,553 B2 | 4/2014 | Trinh et al. |
| 8,814,128 B2 | 8/2014 | Trinh et al. |
| 8,985,544 B1 | 3/2015 | Gulick, Jr. |
| 9,039,785 B2 | 5/2015 | Gulick, Jr. |
| 9,097,380 B2 | 8/2015 | Wheeler |
| 9,117,351 B2 | 8/2015 | Gulick, Jr. |
| 9,285,832 B2 | 3/2016 | Galant |
| 9,298,219 B2 | 3/2016 | Gulick, Jr. |
| 9,625,058 B2 | 4/2017 | Kim |
| 2004/0032329 A1 | 2/2004 | DeConinck et al. |
| 2005/0062606 A1 | 3/2005 | Konecnik |
| 2007/0194918 A1* | 8/2007 | Rabinowitz ........ G08B 13/1454 340/568.2 |
| 2008/0168806 A1 | 7/2008 | Belden et al. |
| 2009/0058643 A1 | 3/2009 | Groth |
| 2009/0079566 A1 | 3/2009 | Goldstein et al. |
| 2009/0173868 A1 | 7/2009 | Fawcett et al. |
| 2010/0301998 A1* | 12/2010 | Marszalek ........ G08B 13/1445 340/5.65 |
| 2011/0062294 A1* | 3/2011 | Johnson .................. A47F 7/024 248/161 |
| 2011/0084689 A1 | 4/2011 | Groth et al. |
| 2011/0309934 A1 | 12/2011 | Henson et al. |
| 2012/0037783 A1* | 2/2012 | Alexander ............. A47F 7/024 248/551 |
| 2012/0120571 A1 | 5/2012 | Bisesti et al. |
| 2012/0192600 A1 | 8/2012 | Johnston et al. |
| 2012/0280810 A1 | 11/2012 | Wheeler |
| 2013/0241731 A1 | 9/2013 | Fawcett et al. |
| 2013/0307692 A1 | 11/2013 | Fawcett et al. |
| 2014/0062698 A1 | 3/2014 | Fawcett |
| 2014/0106608 A1 | 4/2014 | Howarth et al. |
| 2014/0111337 A1 | 4/2014 | Taylor et al. |
| 2014/0263873 A1 | 9/2014 | Kim |
| 2015/0208826 A1 | 7/2015 | Yang et al. |
| 2015/0300050 A1 | 10/2015 | Van Balen |
| 2015/0305518 A1 | 10/2015 | Galant |
| 2016/0188913 A1 | 6/2016 | Galant |
| 2017/0330432 A1 | 11/2017 | Richardson et al. |

FOREIGN PATENT DOCUMENTS

| | | |
|---|---|---|
| WO | 2012047280 A1 | 4/2012 |
| WO | 2012137007 A1 | 10/2012 |
| WO | 2014078966 A1 | 5/2014 |
| WO | 2016139450 A1 | 9/2016 |

OTHER PUBLICATIONS

International Search Report and Written Opinion from corresponding International Application No. PCT/US2015/012378, dated Apr. 21, 2015 (8 pages).

* cited by examiner

SYSTEMS AND METHODS FOR SECURITY SENSING IN A POWER CABLE FOR AN ARTICLE OF MERCHANDISE

CROSS REFERENCE TO RELATED APPLICATION

This application is a continuation of U.S. application Ser. No. 15/667,284, filed Aug. 2, 2017, now U.S. Pat. No. 9,972,178, which is a divisional of U.S. application Ser. No. 15/111,626 filed on Jul. 14, 2016, now U.S. Pat. No. 10,043,356, which is a national phase entry of International Application No. PCT/US2015/012378, filed Jan. 22, 2015, which claims the benefit of priority to U.S. Provisional Application No. 61/930,529 filed on Jan. 23, 2014, the entire disclosures of which are incorporated herein by reference.

FIELD OF THE INVENTION

Embodiments of the present invention relate generally to security systems and methods for displaying articles of merchandise in a retail environment. More particularly, the invention relates to systems and methods for security sensing in a tether for an article of merchandise.

BACKGROUND OF THE INVENTION

Retailers routinely display articles of merchandise, such as telephones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price, and hence the profit margin, for such merchandise continues to decline. Accordingly, these articles of merchandise need to be secured by a security device that effectively and cost efficiently protects the merchandise from theft.

It is common in the field of retail merchandise security to tether electronic devices to a store fixture to prevent theft, yet still allowing a customer to interact with the device. The retailers and their customers want these tethers to be as unobtrusive as possible, making smaller diameter tethers desirable. One problem with keeping tether size small is the number of conductors needed to supply power and sensing signals. Typically, a plurality of conductors is needed to provide both power and security. As a result, reducing the number of conductors while maintaining necessary functionality and security can be challenging.

SUMMARY OF THE INVENTION

In one aspect, the invention is a merchandise security system for displaying and protecting an article of merchandise. The system includes a sensor configured to be secured to the article of merchandise, wherein the sensor including alarming circuitry. The system further includes a tether including a pair of conductors electrically connected to the alarming circuitry, wherein at least one of the pair of conductors is configured to transfer power to the sensor and/or to the article of merchandise. In response to power ceasing to be transferred, the alarming circuitry is configured to monitor an electrical signal transmitted through the pair of conductors in order to determine whether the tether has been cut or removed from the sensor.

In one embodiment, the pair of conductors consists of a positive power conductor and a negative ground conductor. In another embodiment, the tether is coupled to a recoiler such that the tether is extendable and retractable relative to the recoiler. In yet another embodiment, each of the sensor and the recoiler has at least one resistor electrically connected to the pair of conductors in a sense loop circuit, and the alarming circuitry is configured to determine a change in resistance in the sense loop circuit. In still another embodiment, the alarming circuitry and the pair of conductors define the sense loop circuit, and the resistor in the recoiler is disposed across the pair of conductors. In still another embodiment, the alarming circuitry is configured to generate a visual and/or an audible alarm signal in response to the sensor being removed from the article of merchandise, the tether being removed from the sensor, and/or the tether being cut.

In another aspect, the invention is a method for displaying and protecting an article of merchandise. The method includes transferring power through a tether to a sensor attached to the article of merchandise and/or to the article of merchandise, wherein the tether includes a pair of conductors electrically connected to the sensor. The method further includes monitoring, in response to power ceasing to be transferred, an electrical signal transmitted through the pair of conductors in order to determine whether the tether has been cut or removed from the sensor.

In one embodiment monitoring includes repeatedly determining a voltage level in predetermined increments of time. In another embodiment, determining includes determining whether the voltage level is greater than a predetermined voltage level. In yet another embodiment, the method further includes generating a visual and/or an audible alarm signal when the voltage level is greater than the predetermined voltage level. In still another embodiment, the method further includes repeating the step of determining the voltage level if the voltage level is greater than the predetermined voltage level. In still another embodiment, the method further includes generating the electrical signal on the pair of conductors prior to determining the voltage level. In still another embodiment, monitoring includes determining a change in total resistance in a sense loop circuit defined at least by the sensor, the pair of conductors, and a plurality of resistors. In still another embodiment, the method further includes determining whether the pair of conductors has been shorted.

BRIEF DESCRIPTION OF THE DRAWING FIGURES

The detailed description of the invention provided hereafter may be better understood with reference to the accompanying drawing figures, in which embodiments of a merchandise security system for displaying an article of merchandise are disclosed, and in which like reference characters indicate the same or similar parts.

DETAILED DESCRIPTION OF EMBODIMENTS OF THE INVENTION

Figure 1:
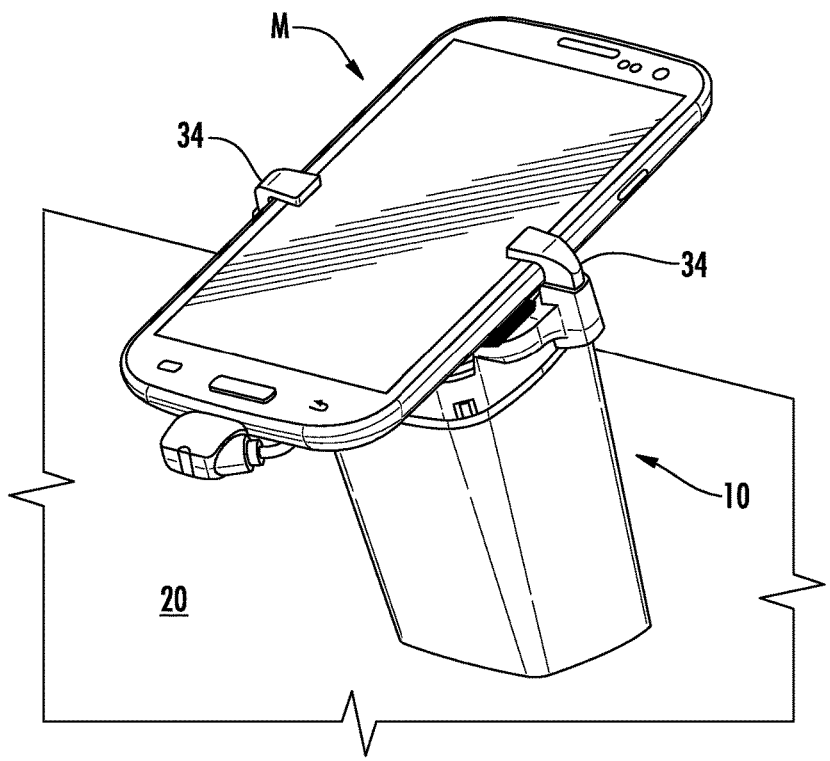
FIG. 1 is a perspective view of a merchandise security system for displaying and protecting an article of merchandise according to an embodiment of the invention.

One or more embodiments of a merchandise security system for displaying an article of merchandise are shown in the accompanying drawing figures and described below. The article of merchandise, indicated generally herein by reference character M, is typically a display model or an operational sample of electronic merchandise, such as portable telephones, smart phones, computers (e.g. notebooks, laptops, tablets, etc.), e-readers, media players, and the like, for a customer to examine before making a decision whether to purchase the article. The article of merchandise is typically displayed in a manner that permits a prospective purchaser to evaluate the operation and features of the merchandise, while protecting the merchandise from theft. In one embodiment, a sensor with alarming circuitry may be attached to the article of merchandise for detecting various alarming conditions, such as the article being removed from the sensor. A tether may be operably engaged with the sensor at one end, while the opposite end may be secured to a base or to a surface of a display fixture. As explained in further detail below, the alarming circuitry of the sensor may also be configured to detect an alarming condition of the tether, such as a cutting, severing, removing or detaching of the tether. As also explained in further detail below, the tether may consist of only a pair of conductors. Thus, unlike conventional tethers that include three, four, or more conductors, the tether according to one embodiment may have only two conductors for providing both power and security functionality. Regardless, the alarming circuitry is configured to monitor an electrical signal in the conductors in order to determine if an alarming condition has occurred.

Figure 2:
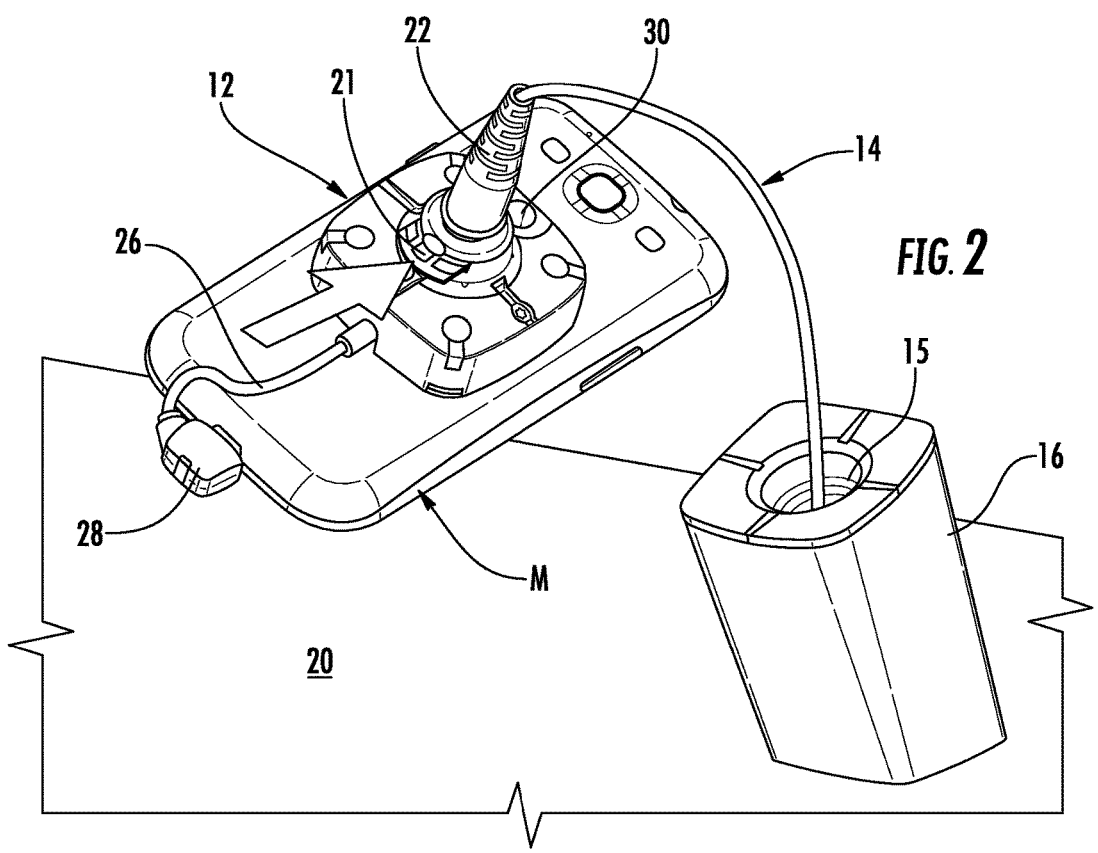
FIG. 2 is a perspective view of another embodiment of a merchandise security system according to the invention shown with the article of merchandise and a sensor attached thereto removed from a base.
Figure 3:
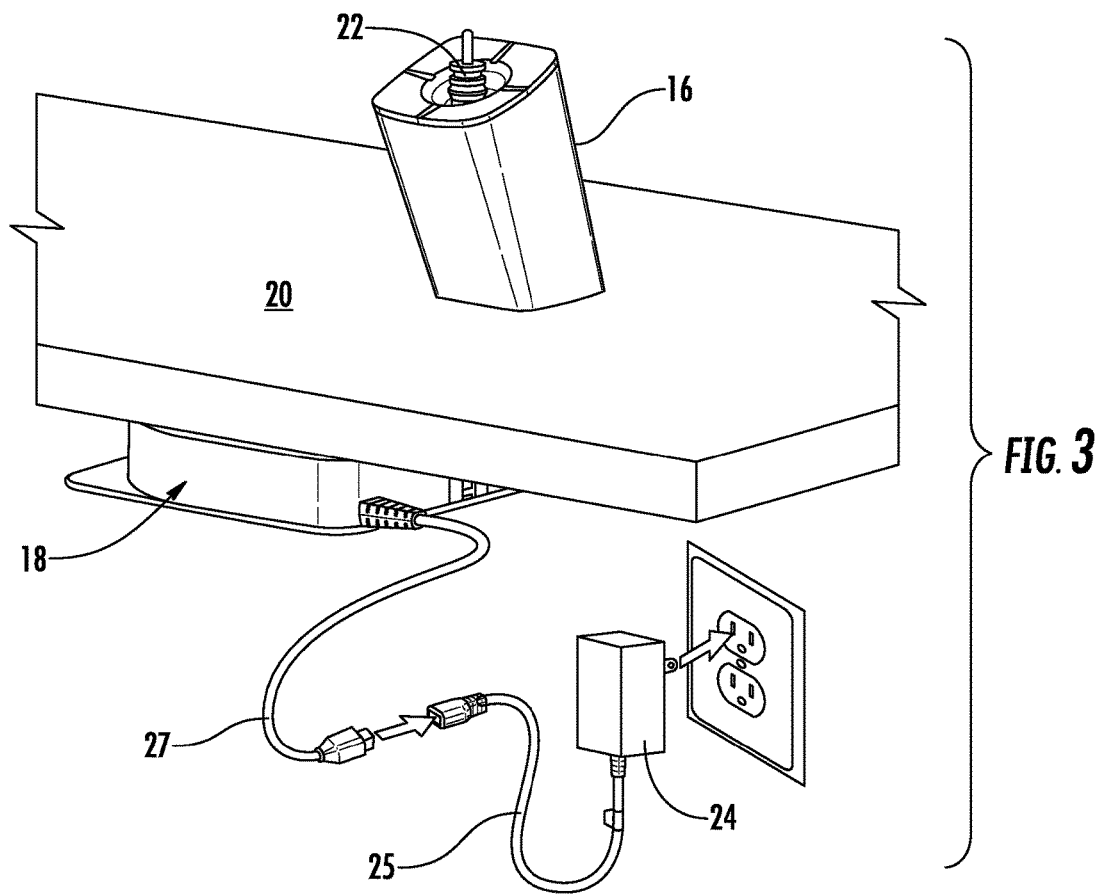
FIG. 3 is a perspective view showing the merchandise security system of FIG. 2 electrically connected to a recoiler secured to a support surface of a display fixture and electrically connected to an external source of power.
Figure 4:
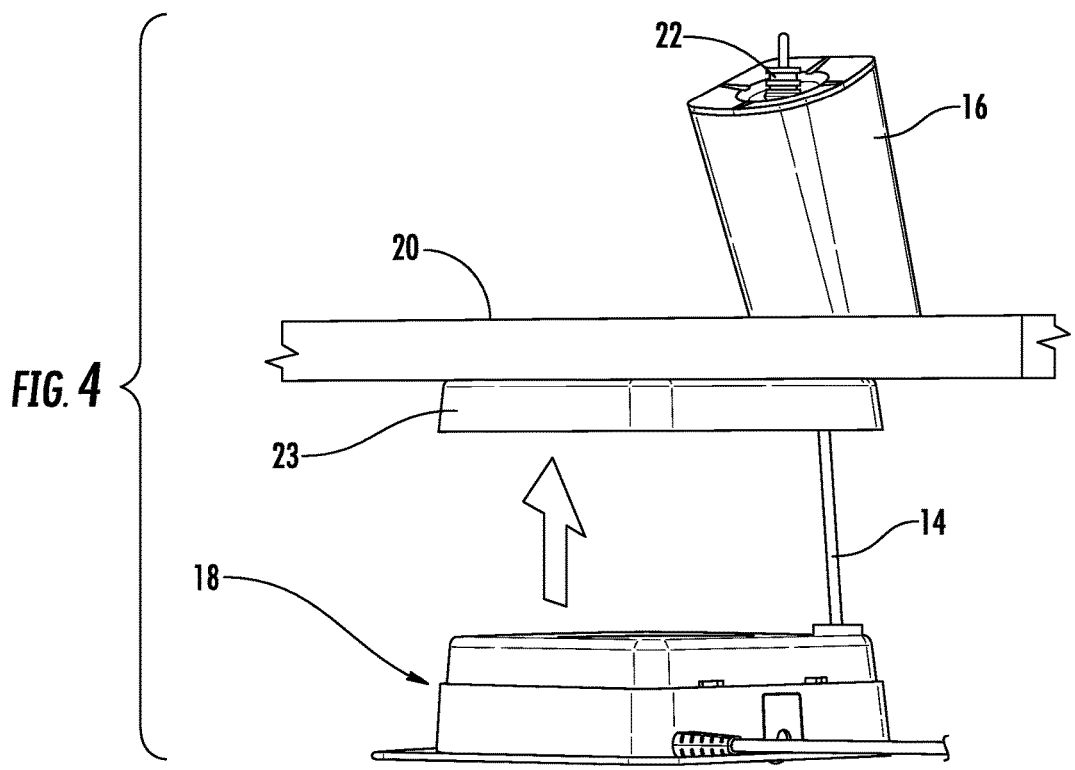
FIG. 4 is a perspective view of the merchandise security system of FIG. 3 showing the recoiler detached from a mounting plate secured to the support surface of the display fixture.

FIGS. 1-4 illustrate embodiments of a merchandise security system, indicated generally herein by reference character 10, for displaying an article of merchandise M and securing the merchandise from theft or unauthorized removal. The system 10 generally includes a sensor 12, a tether 14, a base 16, and a recoiler 18, as shown in the embodiment of FIGS. 2-4. The sensor 12 is configured to be secured to the article of merchandise M, such as with a pressure-sensitive adhesive. Alternatively, or in addition, the sensor 12 may be secured to the article of merchandise M by two or more retaining arms 34, as illustrated in the embodiment of FIG. 1. A first end of the tether 14 may be electrically connected to the recoiler 18, as shown in FIG. 4, while the opposite second end of the tether may include a jack or connector 22 for electrically connecting the tether to the sensor 12, as shown in FIG. 2. Thus, connector 22 may be releasably engaged with sensor 12 to establish electrical communication therebetween. The connector 22 may be further secured in position with a lock mechanism 21, such as a clip, as indicated by the arrow in FIG. 2. As such, when lock mechanism 21 is engaged with connector 22, the connector may not be removed from the sensor 12 without first disengaging the lock mechanism. The lock mechanism 21 may allow tension to be applied to the tether 14 without causing the connector 22 to become inadvertently disconnected from the sensor 12. Furthermore, the lock mechanism 21 may provide stress relief for the electrical connection between the sensor 12 and the tether 14.

The base 16 is configured to removably support the sensor 12 thereon such that a prospective purchaser may remove the article of merchandise M and the sensor secured thereto from the base for inspection, and subsequently return the merchandise to the base for display. The base 16 may define an opening 15 therethrough that allows the tether 14 to extend and retract relative to the base. Recoiler 18 may be disposed within the base 16, or alternatively, the recoiler may be secured below a support surface 20 (e.g., a counter, shelf, or the like) of a display fixture, as shown in FIG. 3. In this regard, the recoiler 18 may include a mounting plate 23 that is configured to be secured to the underside of the support surface 20, in which case the recoiler is configured to engage the mounting plate and be secured thereto. As shown in FIG. 3 and illustrated schematically in FIG. 10, the recoiler 18 may be electrically connected to a power source 24 via an input power cable 25 that is configured to provide power to the recoiler and to the tether 14. A plug or other connector, for example, an AC power plug and AC/DC power converter, may be disposed at a first end of the input power cable 25 for electrically connecting the input power cable to an external source of electrical power, for example, a conventional 110V AC power outlet. A second opposite end of the input power cable 25 may be electrically connected to an input cable 27 of the recoiler 18. In some embodiments, the sensor 12 is also electrically connected to a power cable 26 that is configured to provide electrical power to the article of merchandise M, as shown in FIG. 2. Thus, the power cable 26 may be utilized to facilitate demonstration of the operation of the article of merchandise M on display, as well as for charging a rechargeable battery of the merchandise. FIG. 2 further shows that the power cable 26 may include a connector 28 that is configured to operably engage an input port provided on the article of merchandise M. In some embodiments, the alarming circuitry of the sensor 12 may be configured to detect removal of the connector 28 and to generate an audible and/or a visual alarm signal in response to removal of the connector 28 from the sensor 12.

Figure 7:
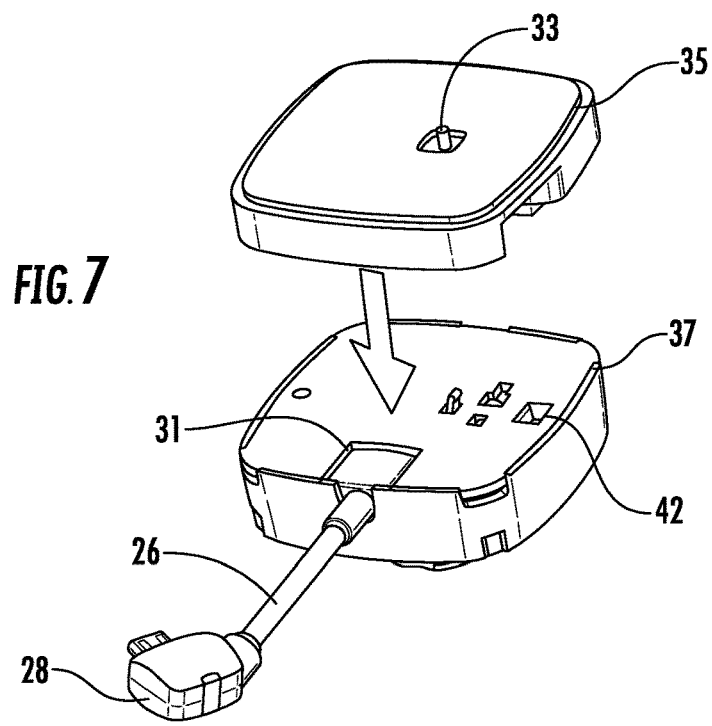
FIG. 7 is a perspective view of another embodiment of a sensor for use with a merchandise security system according to the invention shown with an upper portion of the sensor detached from a lower portion of the sensor.
Figure 8:
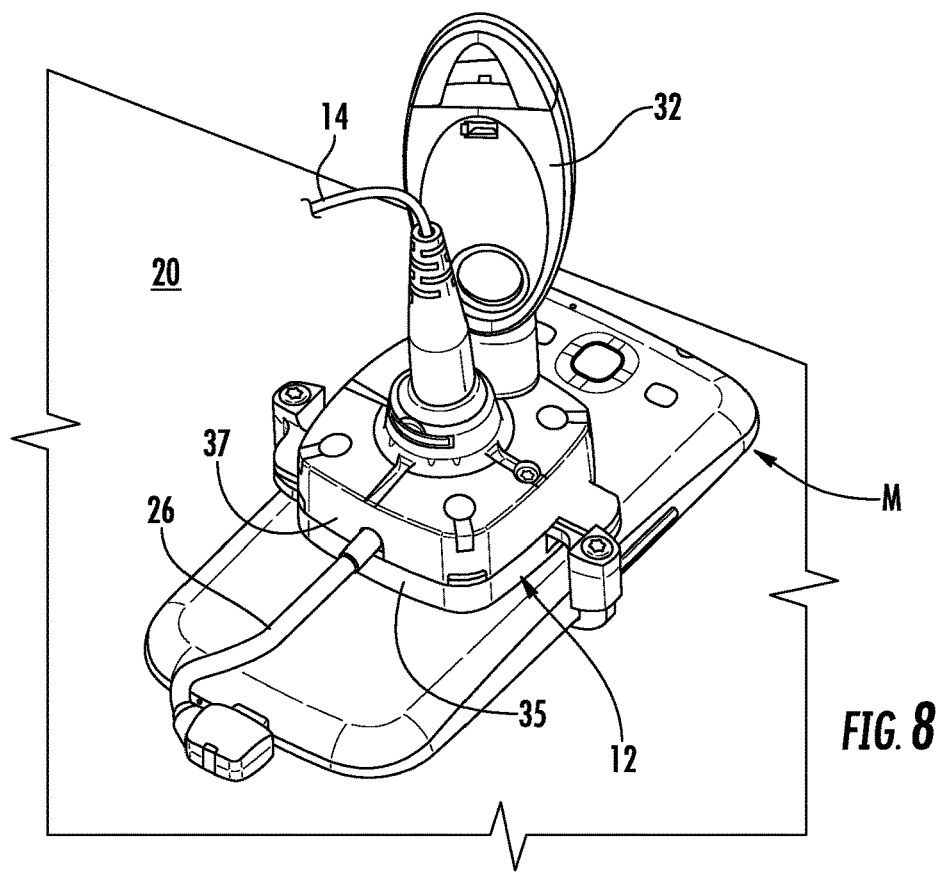
FIG. 8 is a perspective view of a portion of the merchandise security system of FIG. 1 illustrating the use of a key to arm and/or disarm the alarming circuitry of the sensor.

As discussed above, the sensor 12 may include alarming circuitry, a processor, a central processing unit, or the like, that is configured to determine whether various security events have occurred for generating an audible and/or a visual alarm signal. The sensor 12 may also include an alarm (e.g., a piezoelectric device) that is configured to generate an audible alarm. Thus, the sensor 12 may be configured as "alarm-on-product," whereby the sensor is operable to alarm when attached to the article of merchandise M and/or when detached from the article of merchandise. In some cases, the sensor 12 may include a visual indicator (e.g., an LED) for indicating the alarming circuitry is armed and/or alarming. Moreover, the sensor 12 may include a transfer port 30 that is configured to communicate with a key 32 (see, FIG. 8) for arming and/or disarming the alarming circuitry. In one embodiment, the transfer port 30 is configured to communicate wirelessly with key 32 to determine whether the key is authorized to arm and/or disarm the alarming circuitry. According to some embodiments, the key 32 is similar to that described in U.S. Pat. No. 7,737,845, the contents of which are hereby incorporated by reference in their entirety. According to one embodiment, the sensor 12 may include a contact, limit or pressure switch 33 (see, FIG. 7), or the like, that is configured to detect when the article of merchandise M has been removed from the sensor. The alarming circuitry may be configured to detect the removal of the article of merchandise M from the sensor 12 and to generate and an audible and/or a visual alarm signal in response thereto.

In some embodiments, the sensor 12 is a one-piece design that is configured to be attached to the article of merchandise M. FIGS. 5-8 illustrate embodiments wherein the sensor 12 may include an upper portion 35 and a lower portion 37. The upper portion 35 may be configured to be secured to the lower portion 37, such as with a proprietary fastener 39. In addition, the upper portion 35 may be configured to be secured to the article of merchandise M, while the lower portion 37 may be configured to receive the connector 22. FIG. 7 shows that a first end of the power cable 26 may be enlarged and configured to be inserted into a recess 31 formed in the lower portion 37, which secures the power cable therein when the upper portion 35 and the lower portion 37 are secured together. In addition, FIG. 6 shows that upper portion 35 may include an engagement member 40 and FIG. 7 shows that lower portion may include an opening 42 configured to receive the engagement member therein. Engagement between the engagement member 40 and the opening 42 may be used to align the upper portion 35 and the lower portion 37 relative to one another prior to securing the upper and lower portions together.

Figure 5:
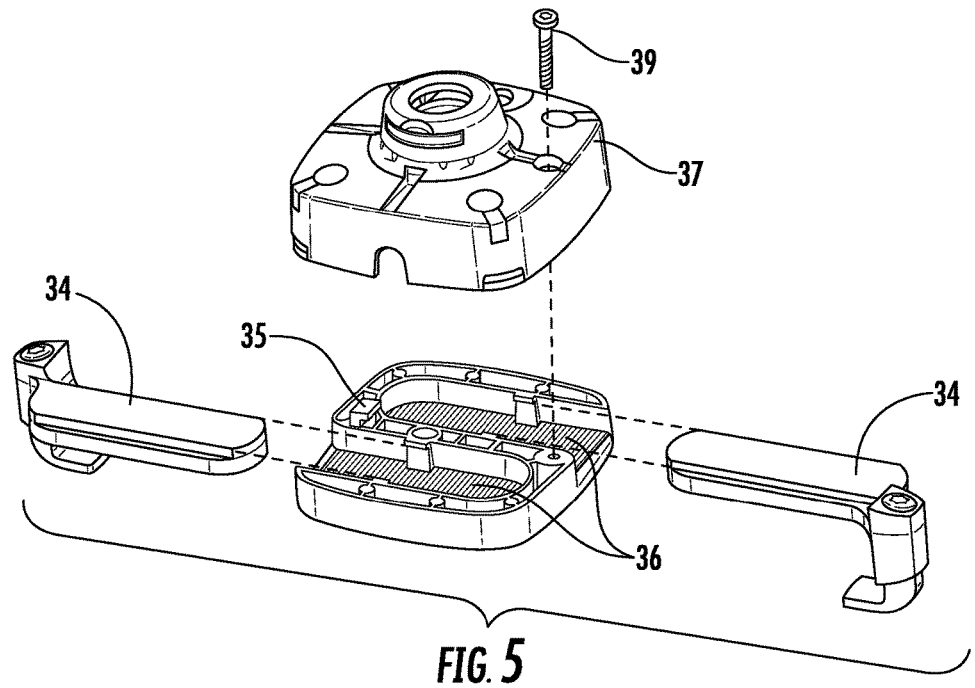
FIG. 5 is an exploded perspective view showing an embodiment of a sensor for use with a merchandise security system according to the invention.
Figure 6:
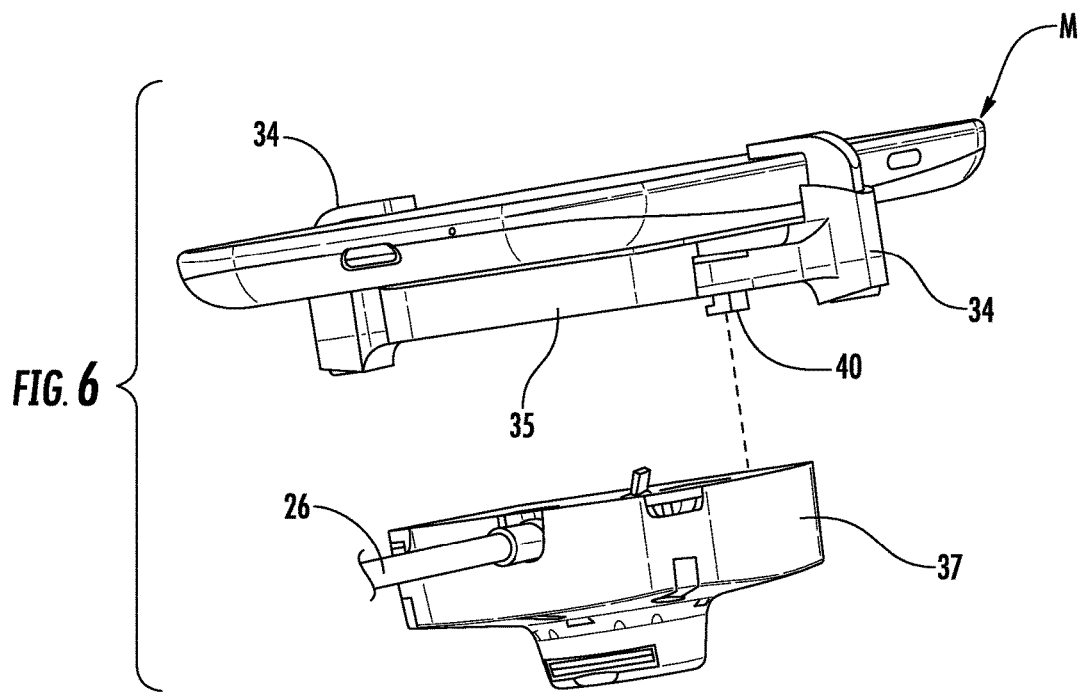
FIG. 6 is an exploded perspective view of the sensor of FIG. 5 shown with an upper portion of the sensor attached to an article of merchandise and a lower portion of the sensor detached from the upper portion.

Furthermore, FIGS. 1, 5-6, and 8 illustrate that sensor 12 may include one or more retaining arms 34 for securing the article of merchandise M to the sensor. In one example, FIG. 5 shows that the upper portion 35 may include a pair of slots 36 that are each configured to receive a respective retaining arm 34 therein. Thus, retaining arms 34 may be configured to slide within the slots 36 to adjust the position of the retaining arms relative to the width or length of the article of merchandise M. As illustrated by FIGS. 5-6, the lower portion 37 may be secured to the upper portion 35 such that the retaining arms 34 are secured therebetween and cannot be removed without first detaching the lower portion from the upper portion.

Figure 9:
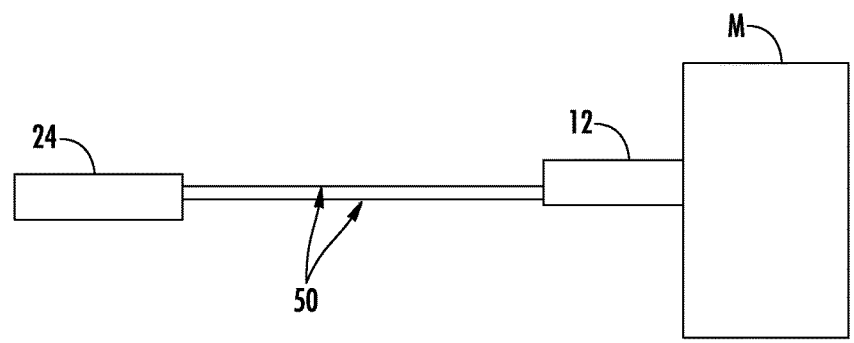
FIG. 9 is a schematic illustrating a pair of conductors configured for transmitting electrical power to the sensor and/or the article of merchandise according to the invention.

Embodiments of the present invention provide for the delivery of electrical power to the article of merchandise M and/or to the sensor 12 through a pair of conductors 50 (see, e.g., FIG. 9) disposed within the tether 14 (removed for purposes of clarity). In some examples, the tether 14 includes only two conductors 50, such as a positive power line and a ground line. An input power source 24 may be in electrical communication with the conductors 50 for transmitting power through the tether 14 and to the article of merchandise M and/or the sensor 12. In order to obtain a sense signal using only the power lines, one technique is to simply detect when the electrical power stops flowing. The problem with this method is that the sensor 12 and/or the article of merchandise M typically do not receive power when there is a power outage, which could cause a false alarm in the merchandise security system 10. Instead, one embodiment of the invention provides security sensing over the same conductors 50 used to supply power to the article of merchandise M and/or the sensor 12. As such, the diameter of the tether 14 may be reduced in comparison to conventional tethers, and the incidence of false alarms may be reduced.

According to some embodiments, the merchandise security system 10 utilizes a security scan for determining whether the tether 14 has been cut or removed from the sensor 12, and/or whether the power cable 26 has been removed from the article of merchandise M. This scan may be performed when input power is no longer being provided. In this case, the sensor 12 and associated alarming circuitry may operate on battery power for carrying out the security scan.

Figure 10:
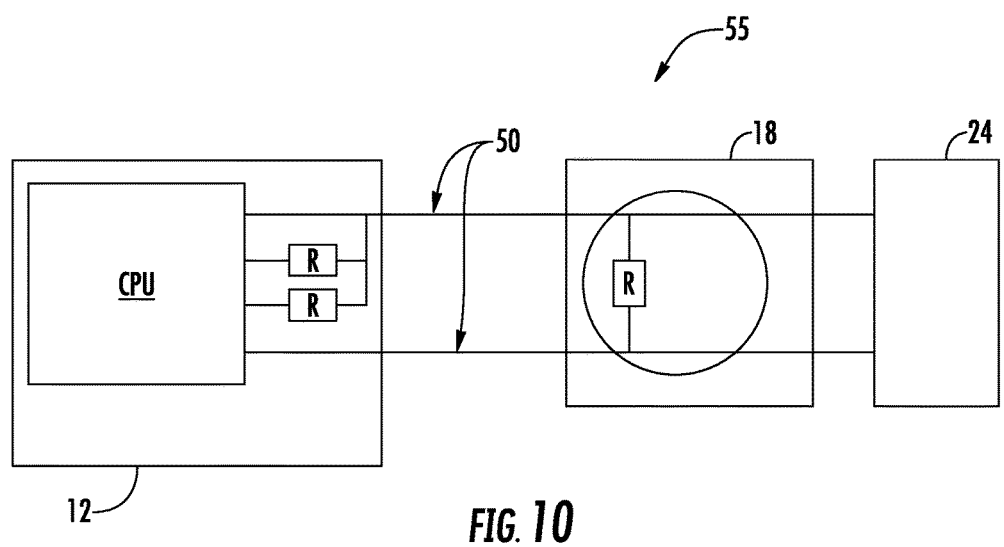
FIG. 10 is a schematic illustrating a sense loop circuit for generating an alarm signal according to the invention.

FIG. 10 schematically illustrates one embodiment of a sense loop circuit 55 defined between the alarming circuitry or a central processing unit (CPU) and the recoiler 18. In this embodiment, the sense loop circuit 55 includes a plurality of resistors R comprising a voltage divider network. One or more resistors R may be disposed in both the sensor 12 and the recoiler 18. The resistor R in the recoiler 18 may be disposed across the pair of conductors. The sense loop circuit 55 may be further defined by the pair of conductors 50 extending through the tether 14. If the tether is cut or disconnected, the total resistive load detected by the alarming circuitry and/or the CPU changes.

Figure 11:
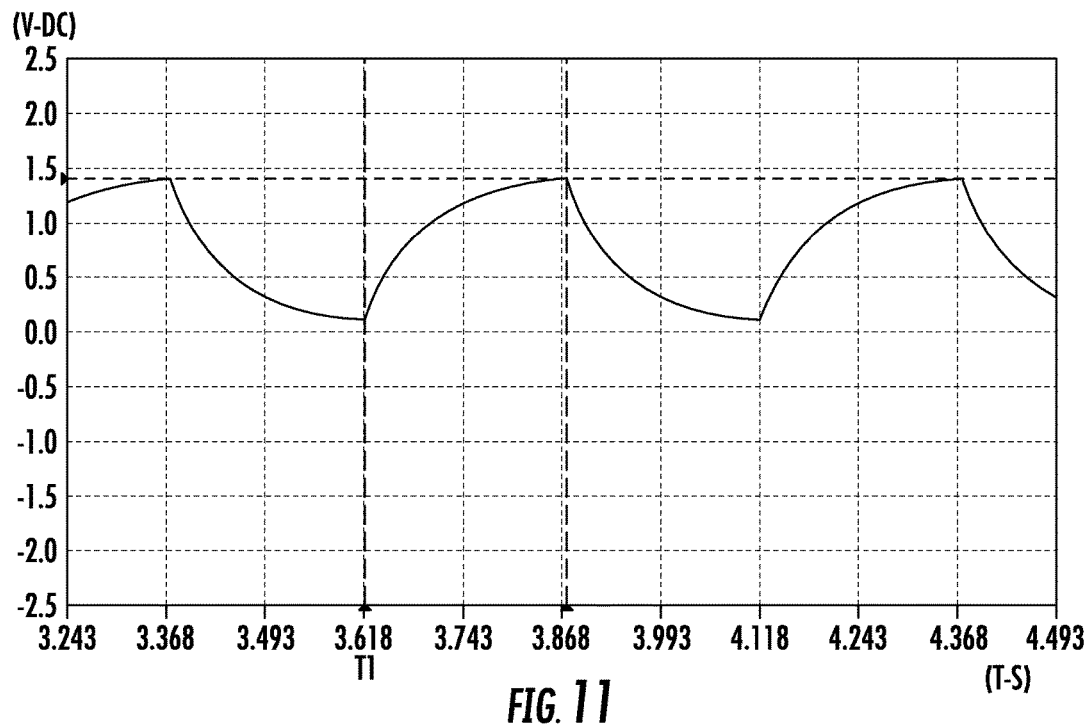
FIG. 11 is a graph depicting the voltage in the sense loop circuit of FIG. 10 when a tether is intact and there is a loss of electrical power.
Figure 12:
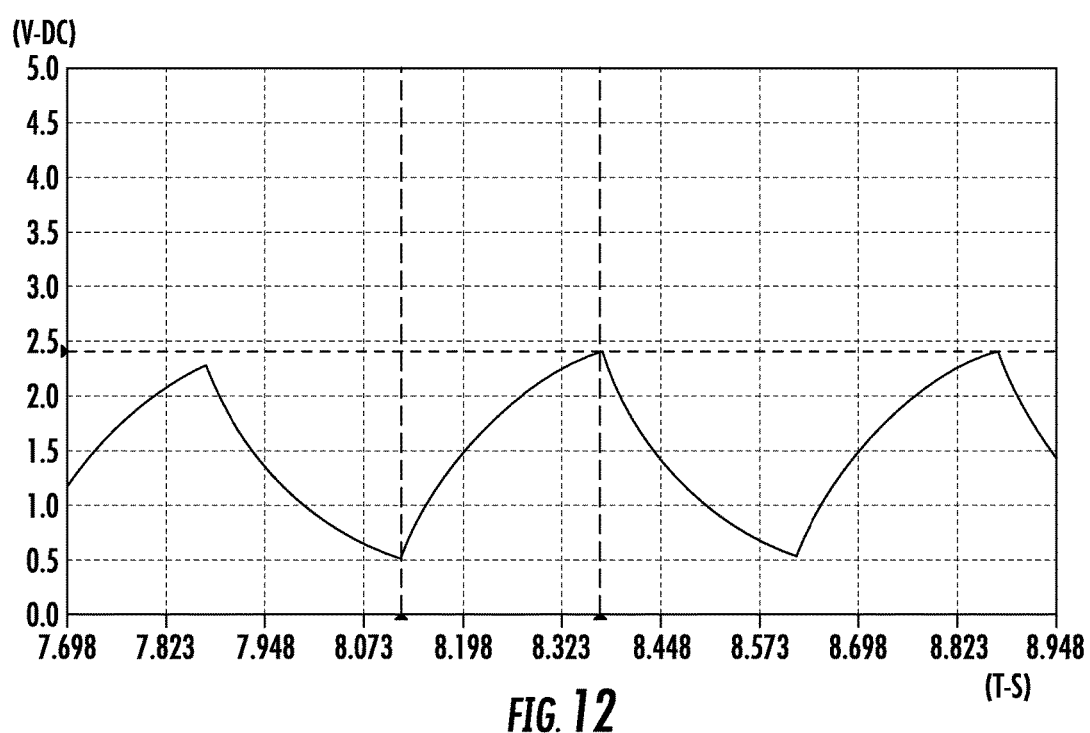
FIG. 12 is a graph depicting the voltage in the sense loop circuit of FIG. 10 when the tether has been cut or removed.
Figure 13:
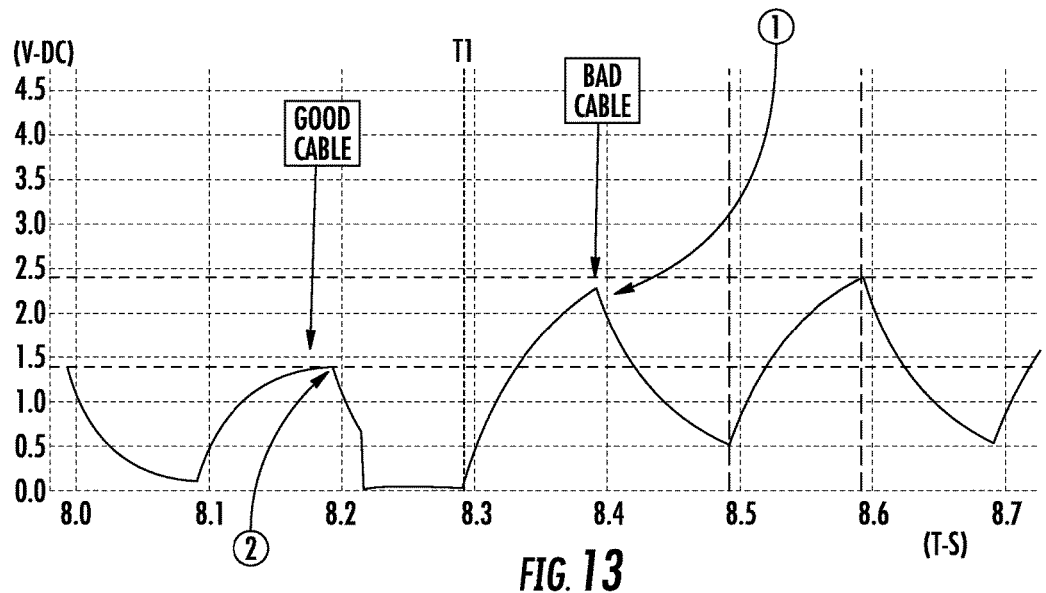
FIG. 13 is a graph depicting the voltage in the sense loop circuit of FIG. 10 for an intact and connected tether, referred to as a "good cable," and a cut or removed tether, referred to as a "bad cable."

FIG. 11 shows a graph depicting the voltage in the sense loop circuit 55 when the tether 14 is intact (i.e., not cut or removed) and there is a loss of electrical power, for example as a result of a power outage. As shown, the voltage in the sense loop circuit 55 is about 1.4 volts. FIG. 12 shows a graph depicting the voltage in the sense loop circuit 55 when the tether 14 has been cut (whether partially or completely) or removed (e.g., disconnected or detached). As shown, the voltage in the sense loop circuit 55 is about 2.4 volts. Thus, the detected voltage level is higher when the tether 14 has been cut or removed (e.g., disconnected or detached). FIG. 13 shows another graph depicting the voltage in the sense loop circuit 55 where an intact and connected tether 14, indicated as a "good cable" in FIG. 13, has a lower voltage than a cut or removed (e.g., disconnected or detached) tether, indicated as a "bad cable" in FIG. 13.

In one embodiment, the security scan commences immediately after power is lost. For example, input power may be provided at about 18 volts, and when power is lost, the detected voltage would be 0 volts. The merchandise security system 10 may include capacitors that do not allow for a sudden drop in voltage, but there is typically a delay before the voltage level drops to the lower level. As the capacitors discharge, the voltage level passes from the initial input power (e.g., about 18 volts), to the "bad cable" range (e.g., about 2.4 volts), and to the "good cable" range (e.g., about 1.4 volts). If the security scan was performed immediately after the power is lost and the tether 14 was intact and connected, the "bad cable" range would be detected, and the tether would be incorrectly indicated as cut or disconnected. However, it is understood that if the scan is initiated immediately after power ceases, the alarming circuitry and/or CPU is able to compare the measured voltage level and the expected voltage level during the voltage decay period. If the measured and expected voltage levels are within a predetermined range during the decay period following a power loss, an alarm is not generated.

Figure 14:
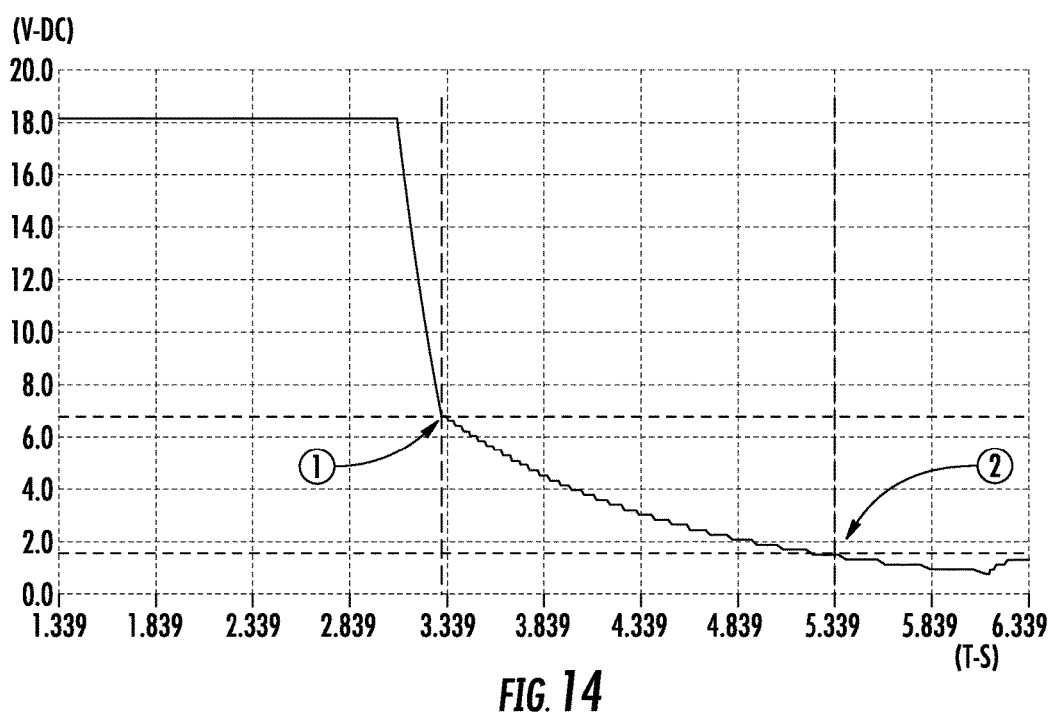
FIG. 14 is a graph depicting an example of the voltage in the sense loop circuit of FIG. 10 where the voltage level is initially at an input power level and thereafter the input power ceases.
Figure 15:
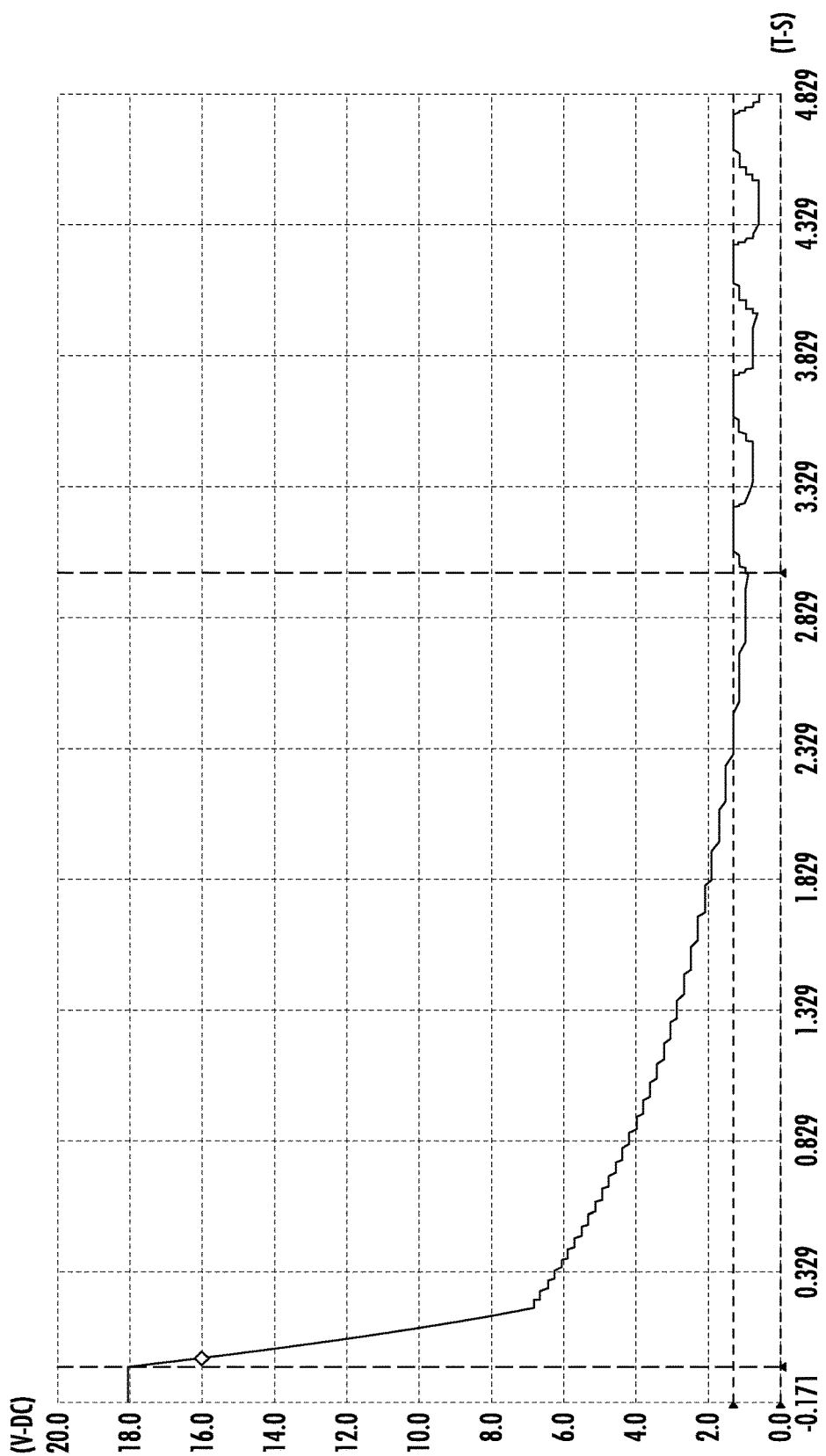
FIG. 15 is a graph depicting another example of the voltage in the sense loop circuit of FIG. 10 where the voltage level is initially at the input power level and thereafter input power ceases.

FIG. 14 shows a graph depicting another example of the voltage in the sense loop circuit 55 where the voltage level is initially at about 18 volts and thereafter the input power ceases at about 3.0 seconds. There is a sharp decline in the voltage level to about 6.8 volts at about 3.3 seconds. This drop may occur in about 250 ms. Then the voltage drops further to about 1.5 volts at about 5.3 seconds, wherein the further drop takes about 2 seconds. FIG. 15 shows a similar graph depicting another example of the voltage in the sense loop circuit 55 where the voltage level is initially at about 18 volts and thereafter the input power is lost. FIG. 15 demonstrates that a security scan may be initiated after a predetermined period of time and after the voltage transition so that false alarms are reduced. In this example, there is about 3 seconds after power is lost before the security scan begins.

Figure 16:
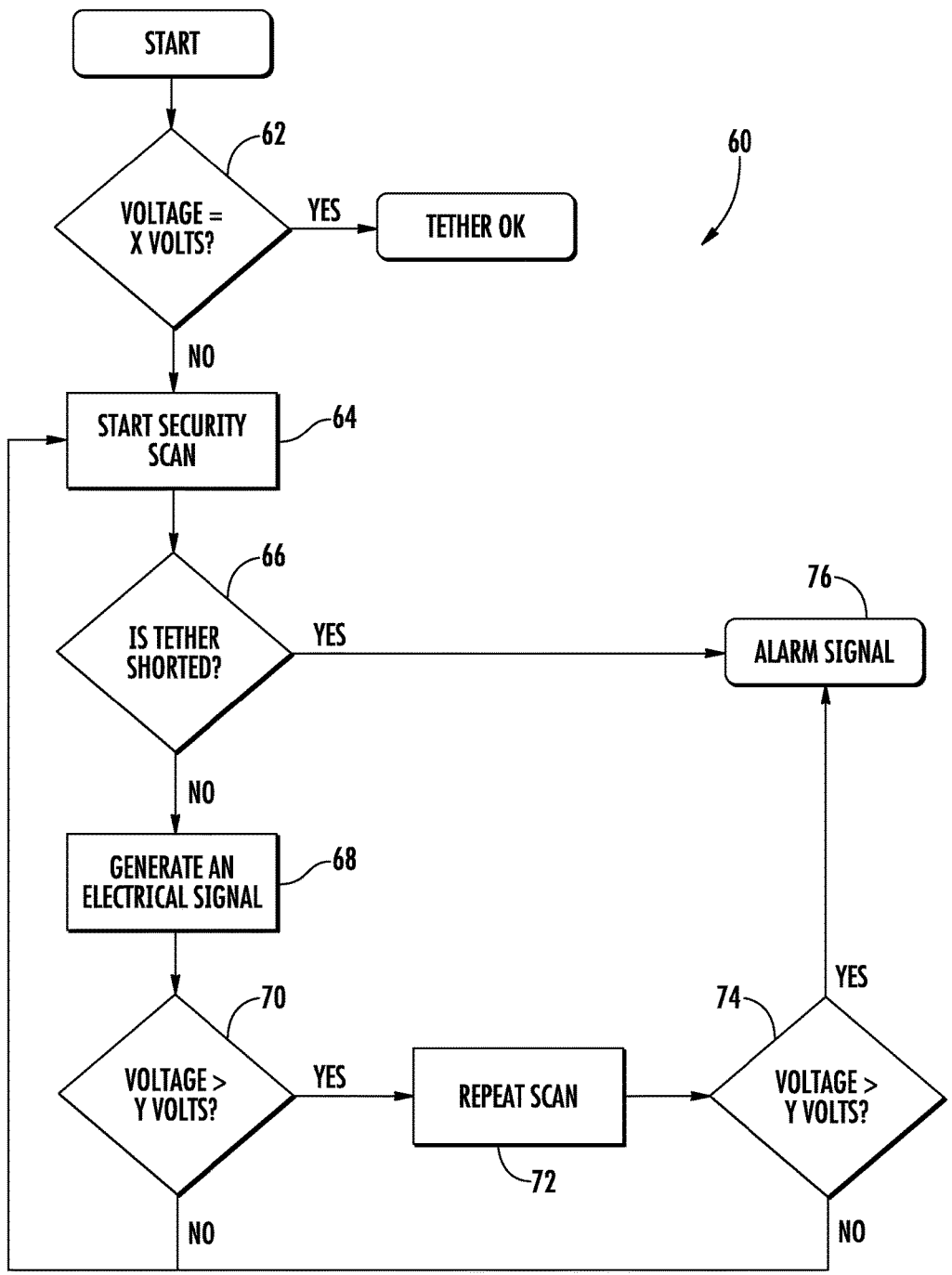
FIG. 16 is a flowchart of a method for displaying and protecting an article of merchandise according to an embodiment of the invention.

FIG. 16 shows a flowchart of an embodiment of a method 60 for determining the integrity and connection of the tether 14 according to the present invention. In the illustrated embodiment, the alarming circuitry and/or CPU may be configured to initially determine whether a voltage level is equal to about "X" volts, as indicated by reference character 62. For example, "X" volts may be the normal input voltage provided, such as about 18 volts. If the voltage is equal to "X" volts, there is no alarm event. If the voltage does not equal "X" volts, a security scan is initiated, as indicated by reference character 64. The security scan may be cyclical in that the scan may be performed repeatedly in predetermined increments of time. The security scan may be initiated immediately after power ceases, or alternatively, after a predetermined delay (e.g., about 2-4 seconds), as discussed above, to allow the voltage in the tether 14 to decay. The security scan may first determine whether the tether 14 has been shorted (e.g., the conductors 50 are crimped together), as indicated by reference character 66. In the case that the tether 14 is shorted, the voltage level will be zero, or close to zero, and an alarm signal will be generated, as indicated by reference character 76. In one embodiment, a cycle of the security scan may be about 200 ms in duration to determine whether the tether 14 is shorted.

If the tether 14 is not shorted, the alarming circuitry or CPU may generate an electrical signal on the pair of conductors 50, as indicated by reference character 68. For example, the electrical signal could be a ping, current, pulse, frequency, or the like. In one embodiment, generating an electrical signal may include setting the bit high on one of the conductors 50 to the alarming circuitry and/or CPU and waiting for the tether 14 to charge. For example, the bit may be set to about 3.0 volts. FIGS. 11 and 13 show that the bit may be set high at time "T1" and then a pause is effectuated (e.g., about 250 ms). The voltage level in the tether 14 is then determined, and if the voltage level is greater than "Y" volts (e.g., about 2.0 volts), as indicated by reference character 70, the security scan is repeated at least one more time, as indicated by reference character 72. If the voltage level is still greater than "Y" volts, as indicated by reference character 74, an alarm signal is generated, as indicated by reference character 76. However, if the voltage level is not greater than "Y" volts, either after the first measurement or the second measurement, the security scan is restarted, as indicated by reference character 64, and no alarm signal is generated.

It is understood that the voltage levels and scanning intervals may be any desired value in order to determine whether to generate an alarm signal and that the aforementioned values are intended only as examples to illustrate the broad principles and concepts of the invention. The determined voltage level may be analog levels (ADC readings), although other values or levels may be determined in order to perform the aforementioned method 60. In addition, it is understood that the steps of the flowchart shown in FIG. 16 are meant for illustrative purposes only and that the steps may be performed in any desired order and that certain steps may be combined or eliminated in various embodiments. For example, the step 66 of determining if the tether 14 is shorted may be eliminated, as the step 70 of determining the voltage level "Y" after the step 68 of generating an electrical signal may be used to determine if the tether 14 has been shorted.

The foregoing has described one or more embodiments of merchandise security systems and methods for displaying and protecting an article of merchandise from theft. Those of ordinary skill in the art will understand and appreciate that numerous variations and modifications of the invention may be made without departing from the spirit and broad scope of the invention. Accordingly, all such variations and modifications are intended to be encompassed by the appended claims.

That which is claimed is:

1. A merchandise security system for displaying and protecting an article of merchandise comprising:
   a sensor configured to attach to the article of merchandise and to detect removal of the article of merchandise from the sensor, the sensor comprising an upper portion and a lower portion;
   a power cable having a connector configured to operably engage an input port on the article of merchandise for providing power to the article of merchandise, wherein the lower portion is configured to connect to an end of the power cable opposite the connector, wherein the upper portion is configured to receive one or more retaining arms for engaging the article of merchandise, wherein the upper portion is configured to attach to the article of merchandise and the lower portion such that the upper portion is disposed between the lower portion and the article of merchandise and at least a portion of the end of the power cable is disposed between the upper portion and the lower portion;
   a base configured to removably support the sensor thereon such that the sensor is removable from the base and positionable on the base; and
   a tether connected to the sensor, wherein the base is configured to receive the tether.

2. The merchandise display system of claim 1, wherein the lower portion comprises a recess configured to receive the end of the power cable.

3. The merchandise display system of claim 2, wherein the end of the power cable received within the recess is configured to be disposed between the upper portion and the lower portion.

4. The merchandise display system of claim 2, wherein the end of the power cable is enlarged relative to a diameter of the cable.

5. The merchandise display system of claim 2, wherein the recess is defined in a surface of the lower portion configured to be secured to the article of merchandise.

6. The merchandise display system of claim 1, wherein the lower portion comprises a top surface and a side surface, and wherein the end of the cable is configured to be received on the top surface and to extend through a slot defined in the side surface.

7. The merchandise display system of claim 1, wherein the tether is coupled to a recoiler such that the tether is extendable and retractable relative to the base.

8. The merchandise display system of claim 7, further comprising a power source electrically connected to the recoiler.

9. The merchandise display system of claim 1, wherein the tether comprises a plurality of conductors for communicating with the sensor.

10. The merchandise display system of claim 1, wherein the upper portion comprises a pair of slots each configured to receive a respective retaining arm.

11. The merchandise display system of claim 1, wherein the lower portion is configured to be secured to the upper portion with at least one fastener.

12. The merchandise display system of claim 1, wherein the lower portion is configured to be secured to the upper portion such that the one or more retaining arms are secured therebetween and cannot be removed without first detaching the lower portion from the upper portion.

13. The merchandise display system of claim 1, wherein the upper portion comprises a contact, limit, or pressure switch configured to detect when the article of merchandise has been removed from the sensor.

14. The merchandise display system of claim 1, further comprising alarming circuitry configured to detect the sensor being removed from the article of merchandise, the tether being removed from the sensor, and/or the tether being cut.

15. The merchandise display system of claim 14, wherein the sensor is configured to wirelessly communicate with a key for arming and/or disarming the alarming circuitry.

16. The merchandise display system of claim 1, wherein the tether comprises a connector at one end configured to be releasably locked to the sensor such that the connector cannot be removed from the sensor without first being unlocked.

17. A merchandise security system for displaying and protecting an article of merchandise comprising:
a sensor configured to attach to the article of merchandise and to detect removal of the article of merchandise from the sensor, the sensor comprising an upper portion and a lower portion; and
a power cable having a connector configured to operably engage an input port on the article of merchandise for providing power to the article of merchandise, wherein the lower portion comprises a recess configured to receive an end of the power cable opposite the connector, wherein the upper portion is configured to receive one or more retaining arms for engaging the article of merchandise, wherein the upper portion is configured to attach to the article of merchandise and the lower portion such that the upper portion is disposed between the lower portion and the article of merchandise and at least a portion of the end of the power cable is disposed between the upper portion and the lower portion.

18. The merchandise display system of claim 17, further comprising a tether connected to the sensor, wherein the base is configured to receive the tether.

19. The merchandise display system of claim 17, wherein the upper portion comprises a pair of slots each configured to receive a respective retaining arm.

20. The merchandise display system of claim 17, wherein the lower portion is configured to be secured to the upper portion such that the one or more retaining arms are secured therebetween and cannot be removed without first detaching the lower portion from the upper portion.

21. The merchandise display system of claim 17, further comprising alarming circuitry configured to detect the sensor being removed from the article of merchandise, the tether being removed from the sensor, and/or the tether being cut, wherein the sensor is configured to wirelessly communicate with a key for arming and/or disarming the alarming circuitry.

22. The merchandise display system of claim 17, wherein the tether comprises a connector at one end configured to be releasably locked to the sensor such that the connector cannot be removed from the sensor without first being unlocked.

23. The merchandise display system of claim 17, wherein the lower portion comprises a recess configured to receive the end of the power cable, wherein the end of the power cable received within the recess is configured to be disposed between the upper portion and the lower portion.

24. A method for displaying and protecting an article of merchandise comprising:
securing an upper portion of a sensor to an article of merchandise, the sensor configured to detect removal of the article of merchandise from the sensor;
engaging one or more retaining arms received by the upper portion to the article of merchandise;
connecting an end of a power cable to a lower portion of the sensor;
operably engaging a connector of the power cable opposite the end with an input port on the article of merchandise for providing power to the article of merchandise; and
securing the lower portion to the upper portion such that the upper portion is disposed between the lower portion and the article of merchandise and at least a portion of the end of the power cable is disposed between the upper portion and the lower portion.

25. The method of claim 24, further comprising:
releasably connecting a tether to the lower portion of the sensor with a connector at one end; and
locking the connector to the sensor with a lock mechanism such that the connector cannot be removed from the sensor without first disengaging the lock mechanism.

26. The method of claim 24, wherein connecting comprises inserting the end within a recess defined in the lower portion.

27. The method of claim 24, wherein engaging comprises engaging a pair of retaining arms received by the upper portion of the sensor to the article of merchandise.

28. The method of claim 24, further comprising actuating a wireless key for arming and/or disarming the sensor.

* * * * *